(12) United States Patent
Vasseur

(10) Patent No.: US 6,344,506 B2
(45) Date of Patent: Feb. 5, 2002

(54) RUBBER COMPOSITION FOR A COLORED TIRE

(75) Inventor: Didier Vasseur, Clermont-Ferrand (FR)

(73) Assignee: Compagnie Generale des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/478,741

(22) Filed: Jan. 6, 2000

Related U.S. Application Data

(63) Continuation of application No. PCT/EP98/04150, filed on Jul. 6, 1997.

(30) Foreign Application Priority Data

Jul. 7, 1997 (FR) .............................................. 97 08760

(51) Int. Cl.$^7$ ................................................. C08K 5/48
(52) U.S. Cl. ............................ 524/91; 524/94; 524/99; 524/291; 524/418
(58) Field of Search ............................ 524/91, 94, 99, 524/102, 103, 291, 418, 492, 493

(56) References Cited

U.S. PATENT DOCUMENTS 3,400,099 A     9/1968  Cook
5,221,559 A  *  6/1993  Martigny ................. 427/419.5
5,354,795 A  * 10/1994  Ueno et al. ................ 524/102
5,871,597 A  *  2/1999  Vasseur ................. 152/209 R

OTHER PUBLICATIONS

Patel, A. R. and Usilton, J.J., "Ultraviolet Stabilization of Polymers: Development with Hindered–Amine Light Stabilizers," *1978 American Chemical Society*, pp.116–132.

XP–002056759, Antioxidants, Antiozonants and Inhibitors, p. 155.

XP–002045760, "Research on antioxidants which do not cause coloration as stabilizing agents for light–weight white sidewall tires," Zinchenko, et al.

* cited by examiner

Primary Examiner—Edward J. Cain
Assistant Examiner—Katarzyna Wyrozebski
(74) Attorney, Agent, or Firm—Baker Botts L.L.P.

(57) ABSTRACT

The invention concerns a white, light-colored tire rubber composition, devoid of carbon black, comprising at least a diene elastomer, a reinforcing white or colored filler, and an anti-photo-oxidizing system, wherein said protective system comprises (A) a 2,2'-methylene-bis-[4-alkyl ($C_1$–$C_{10}$)-6-alkyl($C_1$–$C_{12}$)phenol]; (B) a dialkylthiodipropionate, the alkyl radicals thereof, which may be identical or different, are ($C_1$–$C_{20}$), radicals; (C) a 2-(2-hydroxyphenyl) benzotriazole; and (D) a "HALS" amine derived from 2,2,6,6-tetramethylpiperidine.

37 Claims, No Drawings

RUBBER COMPOSITION FOR A COLORED TIRE

This application is a continuation of prior application No. PCT/EP98/04150, filed Jul. 6, 1997.

BACKGROUND OF INVENTION

The present invention relates to rubber compositions for tires, and also to the antidegradants intended to protect these compositions against atmospheric photo-oxidizing aging due to the combined action of oxygen and light.

The invention relates more particularly to the anti-photo-oxidizing protection of white, clear or colored diene rubber compositions, which are devoid of carbon black, that are reinforced by at least one white or colored filler, in particular silica. Such compositions are sulphur-vulcanizable and form part of colored tires.

It is known that, vulcanized rubber compositions of essentially unsaturated natural and synthetic diene rubbers, because of the presence of double bonds in their molecular chains, are likely to deteriorate more or less rapidly after prolonged exposure to the atmosphere, if they are not protected, as a result of known oxidation mechanisms. These complex mechanisms have been described, for example, in the following documents: ref. [1]: "*Antidegradants for tire applications*" in "*Tire compounding*", Education Symposium No. 37 (ACS), Cleveland, Communication I, October 1995; ref. [2]: "*Non-blooming high performance antidegradants*", Kautschuk Gummi Kunststoffe, Year 47, No. 4, 1994, 248–255; ref. [3]: "*Antioxidants*" in Encycl. Polym. Sci. and Eng., 2d Edition, Vol. 2, 73–91. Following breaking of these double bonds and the oxidation of the sulphur bridges, oxidants bring about stiffening and embrittlement of the vulcanized rubber compositions, which degradation is furthermore accelerated under the combined action of heat by "thermo-oxidation", or alternatively that of light by "photo-oxidation" (see e.g. ref. [4]: "*Photooxidation and stabilization of polymers*", Trends in Polym. Sci., Vol. 4, No. 3, 1996, 92–98; ref. [5]: "*Degradation mechanisms of rubbers*", Int. Polym. Science and Technol., Vol. 22, No. 12, 1995, 47–57).

It has been gradually possible to inhibit these oxidation phenomena as a result of the development and sale of various antioxidants, the most effective of which are, known derivatives of quinoline ("TMQ"), or derivatives of p-phenylenediamine ("PPD" or "PPDA"), which are even more active than the former, such as, for example, N-1,3-dimethylbutyl-N'-phenyl-p-phenylenediamine (6-PPD). These TMQ and PPD-type antidegradants, singly or in combination with each other, have found widespread systematically use (see, e.g., refs. [1] to [3] above) in conventional tire rubber compositions, filled at least in part with carbon black, which imparts thereto their characteristic black color.

Since savings in terms of fuel and the necessity of protecting the environment have become a priority, and in particular since the publication of European Patent Application EP-A-0 501 227, which corresponds to U.S. Pat. No. 5,227,425, the interest in silica-reinforced rubber compositions has been widely revived. The EP '227 application describes a sulphur-vulcanizable rubber composition reinforced, preferably, by a special precipitated silica, which makes it possible to manufacture a tire having a substantially improved rolling resistance, without adversely affecting the other properties, in particular those of adhesion, endurance and wear resistance.

Recently published European Patent Application EP-A-0 810 258, which corresponds to U.S. Pat. No. 5,900,449, discloses a novel diene rubber composition reinforced by another special white filler, in this case a specific alumina ($Al_2O_3$) of high dispersibility, which also makes it possible to obtain tires or treads having such an excellent balance of various properties, as provided above.

Thus, it is henceforth possible to conceive of colored tires being sold which, for aesthetic reasons, in particular in the field of passenger vehicles, meet a real expectation of the users, while being able to provide them with a substantial saving in terms of fuel.

However, the antioxidants described previously, which have been developed and optimized after many years of research into conventional black rubber compositions, are not suitable for protecting tire rubber compositions filled exclusively with white fillers, in particular silica or alumina, because such antioxidants, and in particular the TMQ or PPD derivatives referred to above, are not light-fast. Under the action of UV radiation, they undergo an adverse color change and stain the rubber compositions, which would not allow their use in white, clear or colored compositions. Furthermore, the absence of carbon black, which hitherto acted as a very effective UV absorber in conventional compositions, results in aggravating all the degradation processes described previously, in particular those of photo-oxidation.

It was therefore necessary, in order to be able to develop colored tires, to develop new systems for protecting against photo-oxidizing aging, which improved properties over known antioxidants used for black tires, in particular being effective against UV, while being light-fast and non-staining with respect to the compositions to be protected.

The present invention provides an anti-photo-oxidizing protection system which meets the above demands, this system being compatible first with sulphur vulcanization and second with the harsh conditions of use of tires (temperature, fatigue due to dynamic stresses).

SUMMARY OF THE INVENTION

Consequently, a first aspect of the present invention is a white, clear or colored tire rubber composition devoid of carbon black, the composition comprising at least one diene elastomer, a white or colored reinforcing filler, and an anti-photo-oxidizing protection system, this composition being characterized in that said protection system comprises the following compounds A–D:

(A) a 2,2'-methylene-bis-[4-($C_1$ to $C_{10}$)alkyl-6-($C_1$ to $C_{12}$)alkylphenol];

(B) a dialkyl thiodipropionate, the alkyl radicals of which, which may be identical or different, are $C_1$ to $C_{30}$ radicals, preferably $C_8$ to $C_{20}$ radicals;

(C) a 2-(2-hydroxyphenyl)benzotriazole;

(D) a Hindered Amine Light Stablizer ("HALS") amine derived from 2,2,6,6-tetramethyl piperidine.

A further aspect of the invention is directed to colored tires or colored rubber articles for such tires, comprising a rubber composition according to the invention. In particular, such articles include particular treads, underlayers intended, for example, to be placed beneath these treads, sidewalls, protectors, beads, and more generally any rubber layer or ply which may form part of a tire.

"Colored" tires or rubber articles are understood in the present description to mean tires or rubber articles, at least part of which is of a color other than the conventional black, including white.

A still further aspect of the invention provides a process for protecting a white, clear or colored tire rubber composition, devoid of carbon black, against photo-oxidizing aging, this process being characterized in that an anti-photo-oxidizing system, such as described above, is incorporated by mixing with said composition before the vulcanization thereof.

Finally, the invention is also directed to anti-photo-oxidizing system, as defined above, for protecting these white, clear, or colored tire rubber compositions against photo-oxidation.

DETAILED DESCRIPTION

The invention and its advantages will be readily understood in the light of the following description and examples of embodiment.

I. Measurements and Tests Used

The properties of the rubber compositions of the invention are evaluated as indicated hereafter. In the photo-oxidation, thermo-oxidation and colorimetry tests, the test samples used are non-standardized test samples consisting of strips of rubber of dimensions (length×width×thickness) of 110× 15×2.5 millimeters (mm).

I-1. Tensile Tests

These tests make it possible to determine the elasticity stresses and the breaking properties. Tests carried out on the cured mixes are performed in accordance with the standard AFNOR-NF-T46-002 of September 1988. The secant moduli (in MPa) are measured at 10% elongation (M10) and 100% elongation (M100). Unless indicated otherwise in the text, all these tensile measurements are carried out under normal conditions of temperature and humidity in accordance with the standard AFNOR-NF-T40-101 of December 1979.

I-2. Shore A Hardness Tests

These measurements make it possible to assess the hardness of the compositions after curing, in accordance with standard ASTM D2240-86.

I-3. Hysteresis Losses

The hysteresis losses (HL) are measured by rebound at 60° C. at the sixth impact, and expressed in %, in accordance with the following equation:

$$HL(\%) = 100\,[(W_0-W_1)/W_{01}]$$

in which $W_0$=energy supplied; $W_1$=energy released.

I-4. Photo-oxidation Tests

The compositions in the cured state are subjected to accelerated photo-aging in the following manner: one face of the test piece is exposed for 12 days beneath 4 high-pressure mercury vapour lamps (MAZDA MA400) at 60° C., in a SEPAP 12/24 (MPC) enclosure.

Then the evolution of the mechanical and calorimetric properties is measured. In particular, the tensile tests after accelerated photo-aging are carried out by extensometry of the test samples at stresses of low elongations (10% and 25%), in a first elongation, on an Instron 1122 machine at a low traction speed (10 mm/min). The stresses measured are referenced F10 and F25.

I-5. Thermo-oxidation Tests

These tests make it possible to evaluate the resistance to thermo-oxidation of the materials tested. For this, the parameters M10, M100 and HL are measured, after thermo-oxidizing aging of 30 days, at a constant temperature of 70° C., in an air-ventilated oven.

I-6. Colorimetric Tests

The calorimetric values are determined by means of a Microflash 200 D spectrocolorimeter (Datacolor) in D65/10 configuration (daylight; angle of observation 10°). The colorimetric properties are measured in known manner, in accordance with the instruction manual for the colorimeter (May 1995), by analyzing the reflectance spectrum of the test pieces.

These measurements are transferred to the "CIE LAB" system of the 3 three-dimensional calorimetric coordinates $L^*$, $a^*$, $b^*$, in which system:

the $a^*$ axis represents the green-red chromaticity coordinate, with a scale from −100 (green) to +100 (red);

the $b^*$ axis represents the blue-yellow chromaticity coordinate, with a scale from −100 (blue) to +100 (yellow);

the $L^*$ axis represents the luminosity coordinate, with a scale from 0 (black) to 100 (white);

$DE = [(DL^*)^2+(Da^*)^2+(Db^*)^2]^{1/2}$ represents the overall average colorimetric deviation of each sample relative to a non-aged control; the higher DE is, the more of its initial color the composition has lost.

II. Conditions of Carrying out the Invention

In addition to the usual additives and possibly one (or more) coloring agent(s), the rubber compositions according to the invention comprise at least one diene elastomer, a white or colored filler as a reinforcing filler, an anti-photo-oxidizing protection system which is light-fast and non-staining with respect to the compositions protected, said system comprising the compounds A, B, C and D:

(A) a 2,2'-methylene-bis-[4-($C_1$ to $C_{10}$)alkyl-6-($C_1$ to $C_{12}$)alkylphenol];

(B) a dialkyl thiodipropionate, the alkyl radicals of which, which may be identical or different, are $C_1$ to $C_{30}$ radicals, preferably $C_8$ to $C_{20}$ radicals;

(C) a 2-(2-hydroxyphenyl)benzotriazole;

(D) a Hindered Amine Light Stablizer ("HALS") amine derived from 2,2,6,6-tetramethyl piperidine.

II-1. Diene Elastomer

"Diene" elastomer or rubber is understood to mean, in known manner, an elastomer composed of, at least in part (i.e. a homopolymer or a copolymer), diene monomers (i.e., monomers bearing two double carbon-carbon bonds, whether conjugated or not).

Generally, an "essentially unsaturated" diene elastomer is defined here to mean a diene elastomer comprising conjugated diene monomers, having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of diene monomers which is always less than 15%).

Within the category of "essentially unsaturated" diene elastomers, "strongly unsaturated" diene elastomer comprises in particular, a diene elastomer having a diene monomer content of units of diene origin (conjugated dienes) which is greater than 50%.

As previously indicated, the present invention relates first and foremost to the anti-photo-oxidizing protection of tire compositions based on essentially unsaturated diene elastomers. Of the latter, homopolymers obtained by polymerization of a conjugated diene monomer having 4 to 12 carbon atoms, and also copolymers obtained by copolymerization of one or more conjugated dienes with one another or with one or more vinyl aromatic compounds having 8 to 20 carbon atoms are preferably used.

Suitable conjugated dienes are, in particular, 1,3-butadiene, 2-methyl-1,3-butadiene, the 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers comprise between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequenced or microsequenced elastomers, and may be prepared in dispersion or in solution.

Preferred elastomers are polybutadienes, particularly those having a 1,2 bond content of between 4% and 80% and those having a content of cis-1,4 bonds of more than 80%, polyisoprenes; butadiene-styrene copolymers, and in particular those having a styrene content of between 5% and 50% by weight and, more particularly, between 20% and 40% by weight, a 1,2 bond content of the butadiene part of between 4% and 65%, and a content of trans-1,4 bonds of between 20% and 80%; butadiene-isoprene copolymers and in particular those having an isoprene content of between 5% and 90% by weight and a glass transition temperature (Tg) of −40° C. to −80° C.; and isoprene-styrene copolymers and, in particular, those having a styrene content of between 5 and 50% by weight and a Tg of between −25° C. and −50° C.

In the case of butadiene-styrene-isoprene copolymers, suitable polymers include those having a styrene content of between 5% and 50% and, more particularly, between 10% and 40%, an isoprene content of between 15% and 60% by weight, and more particularly between 20% and 50%, a butadiene content of between 5% and 50% by weight, and more particularly between 20% and 40%, a 1,2 bond content of the butadiene part of between 4% and 85%, a content of trans-1,4 bonds of the butadiene part of between 6% and 80%, a content of 1,2 plus 3,4 bonds of the isoprene part of between 5% and 70%, and a content of trans-1,4 bonds of the isoprene part of between 10% and 50%, and, more generally, any butadiene-styrene-isoprene copolymer having a Tg of between −20° C. and −70° C.

The elastomer may be coupled and/or starred or alternatively functionalized with a coupling and/or starring or functionalizing agent. The elastomer may also be natural rubber or a blend based on natural rubber with any synthetic elastomer, in particular a diene elastomer.

Particularly preferred, the diene elastomers of the composition according to the invention are selected from among the strongly unsaturated diene elastomers which comprise polybutadienes, polyisoprenes or natural rubber, butadiene-styrene copolymers, butadiene-isoprene copolymers, isoprene-styrene copolymers, butadiene-styrene-isoprene copolymers, or a mixture of two or more of these compounds.

When the composition according to the invention is in the form of a tread, the diene elastomer is preferably a butadiene-styrene copolymer, prepared in solution, having a styrene content of between 20% and 30% by weight, a content of vinyl bonds of the butadiene part of between 15% and 65%, a content of trans-1,4 bonds of between 15% and 75% and a Tg of between −20° C. and −55° C. This butadiene-styrene copolymer is optionally used in a mixture with a polybutadiene having preferably more than 90% cis-1,4 bonds.

II-2. Reinforcing Filler

All white fillers (also referred to as clear fillers) capable of reinforcing, alone or in a mixture with each other, a tire rubber composition are suitable as reinforcing fillers. Such fillers include silica, alumina, clays, hydrates or oxides of aluminium and/or magnesium, bentonite, talc, chalk, kaoline or titanium oxide and mixtures thereof, used to a greater or lesser extent depending on the intended application.

Preferably, the amount of reinforcing filler is within a range from 30 to 150 phr (parts by weight to one hundred parts of elastomer(or rubber)), more preferably 30 to 100 phr. The optimum amount of filler differs according to the intended applications: the level of reinforcement expected for a bicycle tire, for example, is of course far less than that required for a tire suitable for travelling at a sustained high speed, for example a motorcycle tire, a tire for a passenger vehicle, or for a utility vehicle such as a heavy truck.

Preferably, when the composition of the invention is intended for use in a tire capable of travelling at high speed, silica ($SiO_2$) or alumina ($Al_2O_3$), or a mixture of the two, form(s) the majority, that is to say, more than 50% by weight, of the total reinforcing filler. More preferably, silica and/or alumina form more than 80% by weight of this total reinforcing filler.

Silica and/or alumina may form the entire reinforcing filler; nevertheless, other white fillers, depending on the intended applications, may advantageously represent a greater or lesser fraction of the reinforcing filler.

It has been noted that another white filler associated, for example, with silica or alumina may have the effect of opacifying colors, i.e., reducing the clear, i.e., more or less translucent, nature of the compositions filled with silica or alumina. This other white filler is preferably selected from among chalk, talc or kaolin, more preferably kaolin; preferably used in an amount of 2.5 to 12.5%, more preferably 5 to 10% (% by weight relative to the weight of silica and/or alumina), depending on the intended applications. For an amount of less than 2.5%, the effect is generally scarcely visible, whereas for amounts greater than 12.5% the mechanical properties of the vulcanized rubber compositions may decrease.

It has also been noted that the use of titanium oxide ($TiO_2$) imparts a pastel tone to the colors selected, which is particularly aesthetic. The amount of titanium oxide preferably varies from 0.5 to 7%, more preferably from 1 to 3% (% by weight relative to the weight of silica and/or alumina), depending on the intended applications. For an amount less than 0.5%, the effect is generally scarcely visible, whereas for amounts greater than 7% there is the risk of blooming on the surface of the vulcanized rubber compositions.

The invention applies equally well to those cases in which a colored reinforcing filler is selected which is compatible with the color desired for the tire, this colored filler possibly being a naturally colored filler, or alternatively obtained by a prior coloring operation, for example a precolored silica or alumina.

The silica used may be any reinforcing silica known to the person skilled in the art, in particular any precipitated or pyrogenic silica having a BET surface area and a specific CTAB surface area both of which are less than 450 m²/g, with highly dispersible precipitated silicas being preferred, particularly when the invention relates to tires having a low rolling resistance. "Highly dispersible silica" is understood to mean any silica having a substantial ability to disagglomerate and to disperse in a polymer matrix, which can be observed by known electron or optical microscopy techniques on thin sections. Non-limitative examples of such preferred highly dispersible silicas, include the silica Perkasil KS 430 from Akzo, the silica BV 3380 from Degussa, the silicas Zeosil 1165 MP and 1115 MP from Rhône-Poulenc, the silica Hi-Sil 2000 from PPG, the silicas Zeopol 8741 or 8745 from Huber, and treated precipitated silicas such as, for example, the aluminium-"doped" silicas described in application EP-A-0 735 088.

The reinforcing alumina is preferably a highly dispersible alumina having a BET surface area from 30 to 400 m²/g, and more preferably from 80 to 250 m²/g, an average particle size of at most 500 nm, and more preferably at most 200 nm, and a high amount of reactive Al—OH surface functions, as described in application EP-A-0 810 258 referred to above. Non-limiting examples of such reinforcing aluminas include the aluminas A125, CR125 and D65CR of Baïkowski.

The physical state in which the reinforcing white filler is present is immaterial, whether it be present in the form of a powder, microbeads, granules or balls. In addition, "reinforcing white filler" is also generally understood to mean mixtures of different reinforcing white fillers, in particular highly dispersible silicas and/or aluminas such as described above.

Any known coupling agent can be used to produce the bond between the reinforcing white filler and the diene elastomer, such as organosilanes. Preferred organosilanes include polysulphurized alkoxysilanes, such as bis(trialkoxy ($C_1$–$C_4$)silylpropyl) tetrasulphides, in particular bis(trimethoxysilylpropyl) or bis(triethoxysilylpropyl) tetrasulphides, in particular the latter of these compounds, of formula $[(C_2H_5O)_3Si(CH_2)_3S_2]_2$, sold, for example, by Degussa under the name Si69, or by Osi under the name URC2.

II-3. Anti-photo-oxidizing System

As stated above, the tire composition according to the invention is protected against photo-oxidizing aging by an anti-photo-oxidizing system which is light-fast and non-staining with respect to this composition, comprising compounds A, B, C and D:

(A) a 2,2'-methylene-bis-[4-($C_1$ to $C_{10}$)alkyl-6-($C_1$ to $C_{12}$)alkylphenol];

(B) a dialkyl thiodipropionate, the alkyl radicals of which, which may be identical or different, are $C_1$ to $C_{30}$ radicals, preferably $C_8$ to $C_{20}$ radicals;

(C) a 2-(2-hydroxyphenyl)benzotriazole;

(D) a "HALS" amine derived from 2,2,6,6-tetramethyl piperidine.

The phenolic compounds A are known antioxidants. Preferred compounds A are those of the following general formula (I)

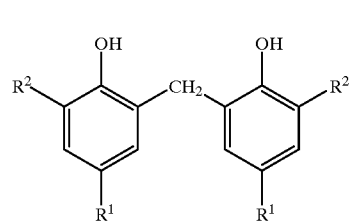

(I)

in which $R^1$=$C_1$ to $C_4$ alkyl, preferably methyl or ethyl, $R^2$=$C_1$ to $C_6$ alkyl, or $C_5$ to $C_{12}$ cycloalkyl.

Preferably compound A is a 2,2'-methylene-bis-[4-(methyl or ethyl)-6-($C_1$–$C_4$)alkylphenol] or a 2,2'-methylene-bis-[4-(methyl or ethyl)-6-($C_7$–$C_8$) cycloalkylphenol].

Compound A is advantageously selected from the group consisting of 2,2'-methylene-bis-[4-methyl-6-t-butylphenol], 2,2'-methylene-bis-[4-ethyl-6-t-butylphenol], 2,2'-methylene-bis-[4-methyl-6-cyclohexylphenol], 2,2'-methylene-bis-[4-methyl-6-alpha-methyl-cyclohexylphenol] and 2,2'-methylene-bis-[4-methyl-6-nonylphenol]. More preferably compound A is 2,2'-methylene-bis-[4-(methyl)-6-t-butylphenol].

Dialkyl thiodipropionates (alkyl-O—CO—CH₂—CH₂—S—CH₂—CH₂—CO—O-alkyl) (Compound B) are also known antioxidants. In particular, those whose two alkyl radicals are identical $C_8$–$C_{20}$ radicals, advantageously dilauryl($C_{12}$)-thiodipropionate, or distearyl($C_{18}$)-thiodipropionate (or dioctadecyl-2,2'-thiodipropionate) are preferred.

Compound C is a UV absorber ("UVA") of the known family of the 2-(2-hydroxyphenyl)-benzotriazoles, which preferably of the general formula (II):

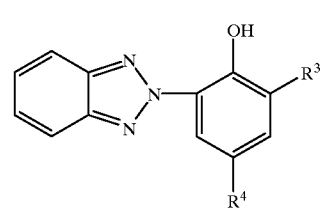

(II)

in which $R^3$ and $R^4$, which may be identical or different, represent various substituted or non-substituted, straight-chain or branched hydrocarbon radicals, in particular $C_1$ to $C_4$ alkyls, in particular methyl or ethyl, or $C_7$ to $C_{20}$ alkylaryls. The benzotriazole ring itself may be substituted in position 4. Preferably the substitution is a halogen, more preferably chlorine.

Compound D is a Hindered Amine Light Stabilizer (HALS) amine derived from 2,2,6,6-tetramethylpiperidine, which is preferably of the general formula (III) below:

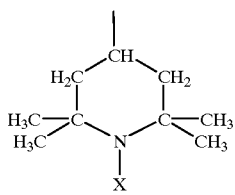

(III)

wherein X is selected from hydrogen or a hydrocarbon group comprising 1 to 20 carbon atoms, preferably a $C_1$–$C_{20}$ alkoxyl.

Such HALS amines may be polymeric, and may have a very large variety of substituents in position 4. They are well-known in the field of UV stabilizers and have been described in a large number of documents, for example in "Polymer Stabilization and Degradation", ACS symposium series 280, Ed. P. P. Klemchuk (1985).

The anti-photo-oxidizing system as described above has proven effective by itself for anti-photo-oxidizing protection of the tire compositions according to the invention. Advantageously, it may constitute the sole anti-photo-oxidizing system, that is to say, both anti-(thermo-)oxidizing and anti-UV, present in the compositions according to the invention.

Depending on the intended applications and the nature of the diene elastomer to be protected, compounds A, B, C and D are present in the compositions according to the invention in the following preferred amounts (in phr):

A: 1 to 5, more preferably 1.5 to 2.5;
B: 0.5 to 3, more preferably 0.5 to 1.5;
C: 0.5 to 3, more preferably 0.5 to 1.5;
D: 0.5 to 3, more preferably 0.5 to 1.5, the total content of the anti-photo-oxidizing system (A+B+C+D) preferably being within a range from 2.5 to 10 phr, more preferably from 3.0 to 7.0 phr.

Below the minimum amounts indicated, the effect of the system may be insufficient, whereas above the maximum amounts indicated, no further improvement in protection is observed, while the costs of the formulation continue to increase.

II-4. Coloring Agent

To implement the invention, any type of coloring agent known to the person skilled in the art may be used. The coloring agent may be either organic or inorganic, and soluble or insoluble in the compositions according to the invention. By way of example, mention may be made of mineral coloring agents, such as powdered metals, in particular powdered copper or aluminium, or various metal oxides, in particular silicates, aluminates, titanates, iron oxides or hydroxides, or mixed oxides of different metallic elements such as Co, Ni, Al or Zn. Organic pigments, such as indanthrones, diketo-pyrrolo-pyrroles or diazo condensates, and organometallic pigments such as phthalocyanines, may also be used.

The color of the compositions according to the invention may thus vary to a very large extent, including different shades of red, orange, green, yellow, blue or even brown or grey. Equally, no coloring agent may be used, and it may be decided to retain the original color of the reinforcing filler, be it white or colored.

II-5. Various Additives

The compositions according to the invention contain, in addition to the compounds previously described, all or part of the constituents usually used in diene rubber compositions for tires, such as plasticizers, a cross-linking system based either on sulphur or on sulphur donors, vulcanization accelerators, extender oils, of the aromatic, naphthenic or paraffinic type, other non-staining antidegradants, in particular antiozonant waxes and chemically active antiozonants, in particular cyclic acetals, or also various anti-fatigue agents.

The compositions according to the invention may contain coupling agents and/or covering agents for the reinforcing filler which are other than those mentioned above, in combination with or instead of the latter, such as polyols, amines or alkoxysilanes.

III. Examples of Embodiments of the Invention

In the following examples, the rubber compositions are prepared by processing the diene elastomers according to known techniques, e.g., by thermomechanical working in a internal paddle mixer, followed by mixing on an external mixer.

By way of example, the procedure is as follows: the elastomer or the mixture of elastomers is introduced into an internal mixer, filled to 70%, the temperature of which is about 60° C., then after a suitable kneading time, for example of the order of I minute, all the other ingredients are added with the exception of the vulcanization system; the thermomechanical kneading work is continued until a dropping temperature of 175° C. The mixture thus obtained is recovered, then the vulcanization system is added on an external mixer (homo-finisher) at 30° C. The vulcanization is effected at 150° C. for 45 minutes.

In this test, seven red rubber compositions intended for the manufacture of tire treads are compared.

These compositions are identical, except for the anti-photo-oxidizing protection system, which is absent in the case of composition No. 1 (non-protected control) and based on a PPD-type antioxidant for composition No. 2 (reference composition). Compositions 3–7 comprise some or all of compounds A, B, C and D.

Composition No. 7 is the only composition according to the invention, which comprises all four compounds (A+B+C+D of the anti-photo-oxidizing protection system).

Compounds A to D, used in this example, all of which are commercially available, are as follows:

(A): 2,2'-methylene-bis-(4-methyl-6-t-butylphenol];
(B): distearyl thiodipropionate;
(C): 2-(2-hydroxyphenyl)benzotriazole in accordance with formula (II) in which:
    $R^3$=t-butyl;
    $R^4$=CH$_2$—CH$_2$—CO—O—[(CH$_2$)$_2$—O]$_n$—H;
(D) tertiary "HALS" amine derived from 2,2,6,6-tetramethyl piperidine in accordance with formula (III) in which:
    substituent in position 1 (X): O—$C_8H_{17}$ (capryloxyl),
    substituent in position 4: [O—CO—(CH$_2$)$_4$]$_2$.

The diene elastomer is an SBR/BR blend. The SBR elastomer (styrene-butadiene copolymer) is prepared in solution, and comprises 25.6% styrene, 60% polybutadiene having 1,2 bonds and 23% polybutadiene having trans 1,4 bonds. The BR elastomer (polybutadiene) is a commercial product, comprising more than 90% cis-1,4 bonds (about 98%).

Tables 1 to 3 show, in succession, the formulation of the various compositions showing the amounts of each component theriox in phr, (Table 1—their properties after curing and the evolution of their mechanical properties after thermo-oxidation and after photo-oxidation (Table 2), and finally the evolution of their colorimetric properties after photo-oxidation (Table 3).

On reading these different tables of results, the following can be noted:

the conventional rubber properties (Table 2), after curing and before aging, are little different from one composition to the other, whether they be protected by one or more antidegradants or not;

after thermo-oxidation (Table 2), it is noted that the results obtained on the composition according to the invention (No. 7) are those which are closest to the results obtained with the conventional antioxidant (6-PPD) acting as a reference. It should be noted here that the lowest percentages of evolution of M10 and M100, noted on the non-protected control (Composition No. 1) are not indicative here of a lower degree of degradation; on the contrary, associated with hysteresis losses which do not decrease, these low percentages of evolution are linked in a manner known to the person skilled in the art to degradation by splitting of the elastomeric chains, on the control composition;

after photo-oxidation (Table 2), it is noted again that the best results are obtained by the anti-photo-oxidizing system comprising all four compounds A, B, C and D (composition No. 7); these results are comparable to those obtained on the reference composition No. 2, see evolution of the Shore A hardness, of F10 and more particularly of F25;

finally, with regard to the evolution of the colorimetric properties (Table 3), it is noted that composition No. 2, which is protected by the PPD derivative, is degraded very substantially and in crippling manner (pronounced blackening), whereas, composition No. 7 according to the invention shows excellent color stability (no staining visible), virtually equivalent to that recorded on the control composition devoid of antidegradant; the parameter DE is close to 10 for the composition according to the invention, whereas it is greater than 30 for the composition based on PPD derivative.

This test clearly shows that compounds A to D, in composition No. 7 according to the invention, reciprocally reinforce their effects, thus making it possible to obtain a far better balance in terms of properties after aging than for the other compositions.

Finally, running tests of long duration were performed on passenger cars with numerous colored tires according to the invention (dimensions 155/70 SR 13; 175/70 SR 13; 185/65 HR 14); these tires had treads and/or sidewalls colored in different colors (red, yellow or green).

These rolling tests led to the following results:

endurance properties equivalent to those observed on conventional black compositions, filled at least in part with carbon black;

adhesion performance, in particular on wet ground, and rolling resistance performance better than those obtained with conventional compositions filled with carbon black, these performances being as good as those obtained on silica-based compositions, such as described in the afore-mentioned application EP-A-0 501 227;

no degradation of the colors after travelling for several tens of thousands of kilometers.

In conclusion, the compositions according to the invention, owing to a synergistic combination of four specific compounds (A, B, C and D), impart to colored tires very good resistance to atmospheric aging due to the combined action of oxygen and UV light. This resistance is comparable to that obtained using a derivative of the PPD type, while guaranteeing these tires excellent color stability which would be impossible with a conventional 6-PPD-type antidegradant.

TABLE 1

| Composition No. | 1 | 2 | 3 | 4 | 5 | 6 | 7 |
|---|---|---|---|---|---|---|---|
| SBR (1) | 50 | 50 | 50 | 50 | 50 | 50 | 50 |
| BR (2) | 50 | 50 | 50 | 50 | 50 | 50 | 50 |
| Silica (3) | 80 | 80 | 80 | 80 | 80 | 80 | 80 |
| Natural kaolin | 5 | 5 | 5 | 5 | 5 | 5 | 5 |
| Coupling agent (4) | 6.4 | 6.4 | 6.4 | 6.4 | 6.4 | 6.4 | 6.4 |
| Paraffin oil | 25 | 25 | 25 | 25 | 25 | 25 | 25 |
| ZnO | 2.5 | 2.5 | 2.5 | 2.5 | 2.5 | 2.5 | 2.5 |
| 6-PPD (5) | | 1.5 | | | | | |
| Compound A (6) | | | 2 | 2 | 2 | 2 | 2 |
| Compound B (7) | | | | 1 | 1 | 1 | 1 |
| Compound C (8) | | | | | 1 | | 1 |
| Compound D (9) | | | | | | 1 | 1 |
| Wax (10) | 1.5 | 1.5 | 1.5 | 1.5 | 1.5 | 1.5 | 1.5 |
| Coloring agent (11) | 2 | 2 | 2 | 2 | 2 | 2 | 2 |
| Stearic acid | 2 | 2 | 2 | 2 | 2 | 2 | 2 |
| Sulphur | 1.1 | 1.1 | 1.1 | 1.1 | 1.1 | 1.1 | 1.1 |
| CBS (12) | 2 | 2 | 2 | 2 | 2 | 2 | 2 |
| DPG (13) | 1.5 | 1.5 | 1.5 | 1.5 | 1.5 | 1.5 | 1.5 |

(1) butadiene-styrene copolymer
(2) polybutadiene Europrene Cis (from Enichem)
(3) silica Zeosil 1165MP (from Rhône-Poulenc)
(4) Si69 (from Degussa)
(5) N-1,3-dimethylbutyl-N'-phenyl-p-pehylenediamine
(6) 2,2'-methylene-bis(4-methyl-6-t-butylphenol) (Vulkanox BKF, from Bayer)
(7) diocta-decyl-2,2-thiodipropionate (Irganox PS 802, from Ciba-Geigy)
(8) 2-(2-hydroxyphenyl)benzotriazole (UVA Tinuvin 213, from Ciba-Geigy)
(9) HALS amine derived from 2,2,6,6-tetramethylpiperidine (Tinuvin 123, from Ciba-Geigy)
(10) antiozonant wax (Redezon 500, from Repsol)
(11) pigment Cromophtal Red BRN CI - Red 144 (from Ciba-Geigy)
(12) N-cyclohexyl-benzothiazyl-sulphenamide
(13) 1,3-diphenylguanidine

TABLE 2

| Composition No. | 1 | 2 | 3 | 4 | 5 | 6 | 7 |
|---|---|---|---|---|---|---|---|
| Before thermo-oxidation: | | | | | | | |
| M10 (MPa) | 5 | 5.1 | 4.9 | 5.4 | 5.2 | 5.3 | 5.4 |
| M100 (MPa) | 2 | 2.1 | 2 | 2.1 | 2 | 2.2 | 2.2 |
| Shore A hardness | 65 | 65 | 66 | 68 | 66 | 66 | 65 |
| HL60 | 31 | 30 | 31 | 32 | 32 | 32 | 32 |
| After thermo-oxidation (30 days at 70° C.): | | | | | | | |
| M10 (MPa) | 5.5 | 5.9 | 6.2 | 6.3 | 6.2 | 6.3 | 6.2 |
| % evolution | 10 | 16 | 27 | 17 | 19 | 19 | 15 |
| M100 (MPa) | 2.5 | 2.8 | 2.8 | 2.8 | 2.7 | 3.0 | 2.9 |
| % evolution | 25 | 33 | 40 | 33 | 35 | 36 | 32 |
| HL | 33 | 26 | 28 | 27 | 27 | 28 | 27 |
| Before photo-oxidation: | | | | | | | |
| F10 (MPa) | 0.55 | 0.59 | 0.58 | 0.6 | 0.6 | 0.62 | 0.55 |
| F25 (MPa) | 0.85 | 0.88 | 0.86 | 0.9 | 0.87 | 0.88 | 0.79 |
| After photo-oxidation (12 days): | | | | | | | |
| F10 (MPa) | 0.95 | 0.95 | 0.97 | 1.02 | 0.99 | 1.03 | 0.9 |
| % evolution | 72 | 61 | 67 | 70 | 65 | 66 | 64 |
| F25 (MPa) | 1.45 | 1.37 | 1.44 | 1.48 | 1.42 | 1.42 | 1.23 |
| % evolution | 71 | 56 | 67 | 64 | 63 | 61 | 56 |
| Shore A hardness | 78 | 76.8 | 78.5 | 81 | 77.8 | 78.5 | 76 |
| % evolution | 20 | 18 | 19 | 19 | 18 | 19 | 17 |

TABLE 3

| Composition No. | 1 | 2 | 7 |
|---|---|---|---|
| Initial colorimetric properties: | | | |
| L* | +38 | +34 | +35 |
| a* | +36 | +31 | +34 |
| b* | +22 | +18 | +20 |
| After 12 days' photo-oxidation: | | | |
| DL | −5 | −14 | −5 |
| Da* | −5 | −28 | −8 |
| Db* | −2 | −14 | −5 |
| DE | +7 | +34 | +11 |

What is claimed is:

1. A white or colored vulcanizable rubber composition, comprising at least one unsaturated diene elastomer, a white or colored reinforcing filler, a sulfur or sulfur-donor based cross-linking system and an anti-photo-oxidizing protection system, said composition being devoid of carbon black and characterized in that said protection system comprises:
    (A) a 2,2'-methylene-bis-[4-($C_1$ to $C_{10}$)alkyl-6-($C_1$ to $C_{12}$)alkylphenol],
    (B) a dialkyl thiodipropionate, the alkyl radicals thereof, which may be identical or different, are $C_1$ to $C_{30}$ radicals,
    (C) a 2-(2-hydroxyphenyl)benzotriazole, and
    (D) a HALS amine derived from 2,2,6,6-tetramethyl piperidine.

2. The composition according to claim 1, in which compound (A) is a 2,2'-methylene-bis-[4-($C_1$–$C_4$)alkyl -6-($C_1$–$C_7$)alkyl phenol].

3. The composition according to claim 2, in which compound A is 2,2'-methylene-bis-[4-(methyl)-6-t-butylphenol].

4. The composition according to claim 1, in which the alkyl radicals of compound (B) are $C_8$ to $C_{20}$ radicals.

5. The composition according to claim 1, in which compound (B) is a ($C_8$ to $C_{20}$) dialkyl thiodipropionate.

6. The composition according to claim 5, in which compound (B) is dilauryl thiodipropionate or distearyl thiodipropionate.

7. The composition according to claim 1, in which the unsaturated diene elastomer is selected from the group consisting of polybutadienes, polyisoprenes or natural rubber, butadiene-styrene copolymers, butadiene-isoprene copolymers, isoprene-styrene copolymers, butadiene-styrene-isoprene copolymers, and mixtures of said elastomers.

8. The composition according to claim 7, in which the unsaturated diene elastomer is a butadiene-styrene copolymer having a styrene content of between 20% and 30% by weight, and said butadiene part of the elastomer has a vinyl bond content of between 15% and 65%, a trans-1,4 bond content of between 15% and 75%, and a glass transition temperature of between −20° C. and −55° C.

9. The composition according to claim 8, in which the unsaturated diene elastomer is an admixture of a butadiene-styrene copolymer and a polybutadiene having a cis 1,4 bond content of greater than 90%.

10. The composition according to claim 1, in which the reinforcing filler comprises silica and/or alumina.

11. The composition according to claim 10, further comprising an additional white filler selected from the group consisting of chalk, talc and kaolin, in an amount of 2.5 to 12.5% by weight relative to the weight of silica and/or alumina.

12. The composition according to claim 10, further comprising titanium oxide, in an amount of 0.5 to 7% by weight relative to the weight of silica and/or alumina.

13. The composition according to claim 11, further comprising titanium oxide in an amount of 0.5 to 7% by weight relative to the weight of silica and/or alumina.

14. A process for protecting a white or colored vulcanized rubber composition against photo-oxidizing aging, the process comprising (a) incorporating by mixing into said composition which comprises at least one unsaturated diene elastomer, a white or colored reinforcing filler, a sulfur or sulfur-donor based cross-linking system and being devoid of carbon black, an anti-photo-oxidizing system which comprises:
    (A) a 2,2'-methylene-bis-[4-($C_1$ to $C_{10}$)alkyl-6-($C_1$ to $C_{12}$)alkylphenol],
    (B) a dialkyl thiodipropionate, the alkyl radicals thereof, which may be identical or different, are $C_1$ to $C_{30}$ radicals,
    (C) a 2-(2-hydroxyphenyl) benzotriazole, and
    (D) a HALS amine derived from 2,2,6,6-tetramethyl piperidine and (b) vulcanizing the resulting mixture.

15. The process according to claim 14, in which compound (A) is a 2,2'-methylene-bis-[4-($C_1$–$C_4$)alkyl -6-($C_1$–$C_7$)alkylphenol].

16. The process according to claim 15, in which compound (A) is 2,2'-methylene-bis-[4-(methyl)-6-t-butylphenol].

17. The process according to claim 14, in which the alkyl radicals of compound (B) are $C_8$–$C_{20}$ radicals.

18. The process according to claim 14, in which compound (B) is a ($C_8$ to $C_{20}$)dialkyl thiodipropionate.

19. The process according to claim 18, in which compound (B) is dilauryl thiodipropionate or distearyl thiodipropionate.

20. An anti-photo-oxidizing protection system for a white or colored tire rubber composition devoid of carbon black, said protection system comprising:
    (A) a 2,2'-methylene-bis-[4-($C_1$ to $C_{10}$)alkyl-6-($C_1$ to $C_{12}$)alkylphenol],
    (B) a dialkyl thiodipropionate, the alkyl radicals thereof, which may be identical or different, are $C_1$ to $C_{30}$ radicals,
    (C) a 2-(2-hydroxyphenyl)benzotriazole, and
    (D) a HALS amine derived from 2,2,6,6-tetramethyl piperidine.

21. The protection system according to claim 20, in which compound (A) is a 2,2'-methylene-bis-[4-($C_1$–$C_4$)alkyl-6-($C_1$–$C_7$)alkyl phenol].

22. The protection system according to claim 21, in which compound (A) is 2,2'-methylene-bis-[4-(methyl)-6-t-butylphenol].

23. The protection system according to claim 20 in which the alkyl radicals of compound (B) are $C_8$–$C_{20}$ radicals.

24. The protection system according to claim 20, in which compound (B) is a ($C_8$ to $C_{20}$) dialkyl thiodipropionate.

25. The protection system according to claim 24, in which compound (B) is dilauryl thiodipropionate or distearyl thiodipropionate.

26. The composition according to claim 1, in which the total content of the anti-photo-oxidizing system (A+B+C+D) is within a range from 2.5 to 10 phr.

27. The composition according to claim 26, in which the total content of the anti-photo-oxidizing system (A+B+C+D) is within a range from 3.0 to 7.0 phr.

28. The composition according to claim 1, in which compounds A, B, C and D are present in the following amounts:

A: 1 to 5 phr;
B: 0.5 to 3phr;
C: 0.5 to 3 phr;
D: 0.5 to 3 phr.

29. The composition according to claim 26, in which compounds A, B, C and D are present in the following amounts:

A: 1.5 to 2.5 phr;
B: 0.5 to 1.5 phr;
C: 0.5 to 1.5 phr;
D: 0.5 to 1.5 phr.

30. The composition according to claim 11, the additional white filler selected from the group consisting of chalk, talc and kaolin, being present in an amount of 5 to 10% by weight relative to the weight of silica and/or alumina.

31. The composition according to claim 12, the titanium oxide being present in an amount of 1 to 3% by weight relative to the weight of silica and/or alumina.

32. The composition according to claim 2, in which compound (A) is selected from the group consisting of 2,2'-methylene-bis-[4-methyl-6-t-butylphenol], 2,2'-methylene-bis-[4-ethyl-6-t-butylphenol], 2,2'-methylene-bis-[4-methyl-6-cyclohexylphenol], 2,2'-methylene-bis-[4-methyl-6-alpha-methyl-cyclohexylphenol] and 2,2'-methylene-bis-[4-methyl-6-nonylphenol].

33. A colored tire or rubber article for such a tire, comprising a rubber composition according to any one of claims 1 to 13, or 26 to 32.

34. A rubber article comprising a rubber composition according to any one of claims 1 to 13, 1 or 26 to 32 in which the rubber article is selected from the group consisting of treads, under layers, sidewalls, protectors and beads.

35. The tire of claim 33 wherein the white or colored rubber composition is in the tread of the tire.

36. The tire of claim 33 wherein the white or colored rubber composition is in the sidewall of the tire.

37. Tire tread comprising a white or colored rubber composition according to anyone of claims 1 to 13, and 26 to 32.

* * * * *

UNITED STATES PATENT AND TRADEMARK OFFICE
CERTIFICATE OF CORRECTION

PATENT NO. : 6,344,506 B2
DATED : February 5, 2001
INVENTOR(S) : Didier Vasseur

It is certified that error appears in the above-identified patent and that said Letters Patent is hereby corrected as shown below:

Title page,
Item [63], Related U.S. Application Data, "PCT/EP98/04150, filed on July 6, 1997."
should read -- PCT/EP98/04150, filed July 6, 1998, published as WO 99/02590. --
Item [73], Assignee, "Generale" should read -- Générale --

Column 1,
Line 18, "that," should read -- that --

Column 3,
Line 43, in the equation, "$W_{0]}$," should read -- $W_0$], --
Lines 51 and 66, "calorimetric" should read -- colorimetric --

Column 4,
Line 6, "calorimetric" should read -- colorimetric --
Line 35, "Stablizer" should read -- Stabilizer --
Line 40, "i.e." should read -- i.e., --

Column 10,
Line 61, "theriox" should read -- therein --

Column 12,
Table 1, fn (5), "pehylenediamine" should read -- phenylenediamine --

Column 15,
Line 2, "3phr;" should read -- 3 phr; --

UNITED STATES PATENT AND TRADEMARK OFFICE
CERTIFICATE OF CORRECTION

PATENT NO. : 6,344,506 B2
DATED : February 5, 2001
INVENTOR(S) : Didier Vasseur

It is certified that error appears in the above-identified patent and that said Letters Patent is hereby corrected as shown below:

<u>Column 16,</u>
Line 11, "1" (second occurrence) should be deleted.

Signed and Sealed this

Seventeenth Day of September, 2002

Attest:

JAMES E. ROGAN
Attesting Officer  Director of the United States Patent and Trademark Office